United States Patent [19]

Shaltis

[11] 4,454,984
[45] Jun. 19, 1984

[54] AUXILIARY CIRCULATION SYSTEM FOR VEHICLE HEATERS

[75] Inventor: Jerold R. Shaltis, Grand Rapids, Mich.

[73] Assignee: Evans Products Company, Portland, Oreg.

[21] Appl. No.: 438,268

[22] Filed: Nov. 1, 1982

[51] Int. Cl.³ ............................................. G05D 23/00
[52] U.S. Cl. ................................ 237/2 A; 237/12.3 B; 307/10 BP
[58] Field of Search ..................... 237/12.3 A, 12.3 B, 237/12.3 C, 2 A; 307/10 BP, 10 LS, 10 R

[56] References Cited

U.S. PATENT DOCUMENTS 3,269,653  8/1966  Howard .......................... 237/12.3 B
3,395,288  7/1968  Von Brimer ................... 307/10 BP

FOREIGN PATENT DOCUMENTS 2521462  11/1975  Fed. Rep. of Germany ... 307/10 BP

*Primary Examiner*—Albert J. Makay
*Assistant Examiner*—Henry Bennett
*Attorney, Agent, or Firm*—Robert E. Howard

[57] ABSTRACT

The invention relates to an improved auxiliary circulation system for vehicle heaters in which the engine coolant is circulated through the vehicle heater after the engine is shut off. The improved system includes a voltage monitor coupled between the power source and an auxiliary electric pump to monitor the voltage of the power source and prevent the system from being actuated unless the power source voltage exceeds a predetermined level and to open the circuit between the power source and the pump when the power source voltage drops below a predetermined level.

7 Claims, 2 Drawing Figures

4,454,984

AUXILIARY CIRCULATION SYSTEM FOR VEHICLE HEATERS

BACKGROUND OF THE INVENTION

The heating system of a motor vehicle generally comprises a heat exchanger through which the engine coolant is circulated, including fan means for circulating the air of the passenger compartment through the heat exchanger. Such systems only operate when the engine is running since the coolant is circulated by mechanical pumps operating directly off the engine. It has long been known that it would be desirable to be able to continue heating the passenger compartment without running the engine. For example, U.S. Pat. Nos. 2,170,032 issued to Page, 2,230,051 issued to Conklin, 2,801,802 issued to Jackson, and British Pat. No. 1,551,296 issued to Arden-Mark, Inc. all disclosed auxiliary circulation devices for effecting circulation of engine coolant through a vehicle heater system after engine shutdown. The devices disclosed in these patents all disclose the use of an auxiliary pump driven by an electric motor inserted into the engine coolant circulation system which may be actuated upon engine shutdown to thereby continue the circulation of engine coolant through the heater of the vehicle.

In the Page and Conklin devices, a simple on/off switch is employed to actuate the auxiliary pump. The Jackson and Arden-Mark devices additionally employ a thermostatic switch for automatically shutting off the auxiliary pump and fan motor when the temperature of the coolant drops below a predetermined level.

It is an object of the present invention to provide an improved auxiliary circulation system for vehicle heaters having a voltage monitor which permits the system to operate only when the power supply of the vehicle falls within predetermined limits.

BRIEF SUMMARY OF INVENTION

The object of the present invention is accomplished by employing a voltage monitor in an auxiliary circulation system having auxiliary electric pump inserted into the circulation system of a motor vehicle to circulate the coolant of the engine through the vehicle's heater system after engine shutdown.

The voltage monitor includes first and second voltage responsive means. The first voltage responsive means couples the power supply to the auxiliary electric pump and heater fan, and closes the circuit therebetween only when the voltage of the power supply exceeds a predetermined upper voltage level. The second voltage responsive means uncouples the power supply to the auxiliary electric motor and heater fan when the voltage of the power supply drops below a predetermined lower voltage level.

DETAILED DESCRIPTION OF INVENTION

Figure 1:
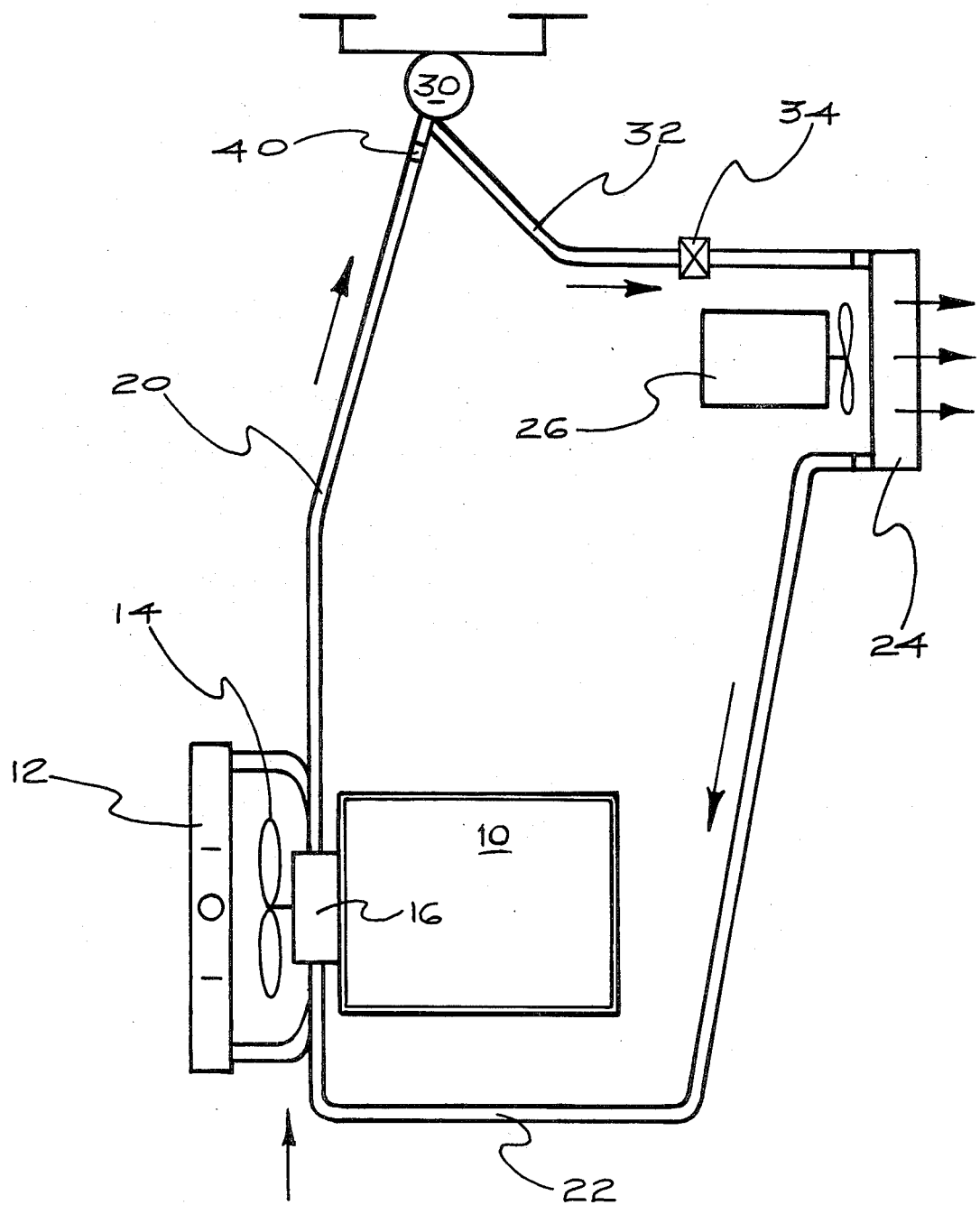
FIG. 1 is a schematic diagram of the coolant circulation system of the present invention.

FIG. 1 illustrates the overall layout of the auxiliary circulation system of the present invention. In this figure, an internal combustion engine 10 is shown with its associated radiator 12 and radiator fan 14. During the operation of internal combustion engine 10, the coolant pump 16, which is driven from the engine by means of a belt (not shown) pumps heated coolant via coolant conduit 20 to heater 24. Heater 24 is essentially a heat exchanger in communication with the passenger compartment of the vehicle through which the heated coolant circulates. In association with heater 24 is blower fan 26 which circulates engine compartment air through the heater 24 in the direction shown by the arrows. The coolant is returned to the engine via coolant conduit 22.

Interposed in coolant conduit 20, which normally runs directly to heater 24, is an auxiliary electric pump 30 which is used to pump coolant to heater 24 via coolant conduit portion 32 during the engine shutdown condition. A water valve 34 may be inserted into line 32 if desired.

The voltage control circuit for the auxiliary circulation system of the present invention will now be explained with particular reference to FIG. 2.

Figure 2:
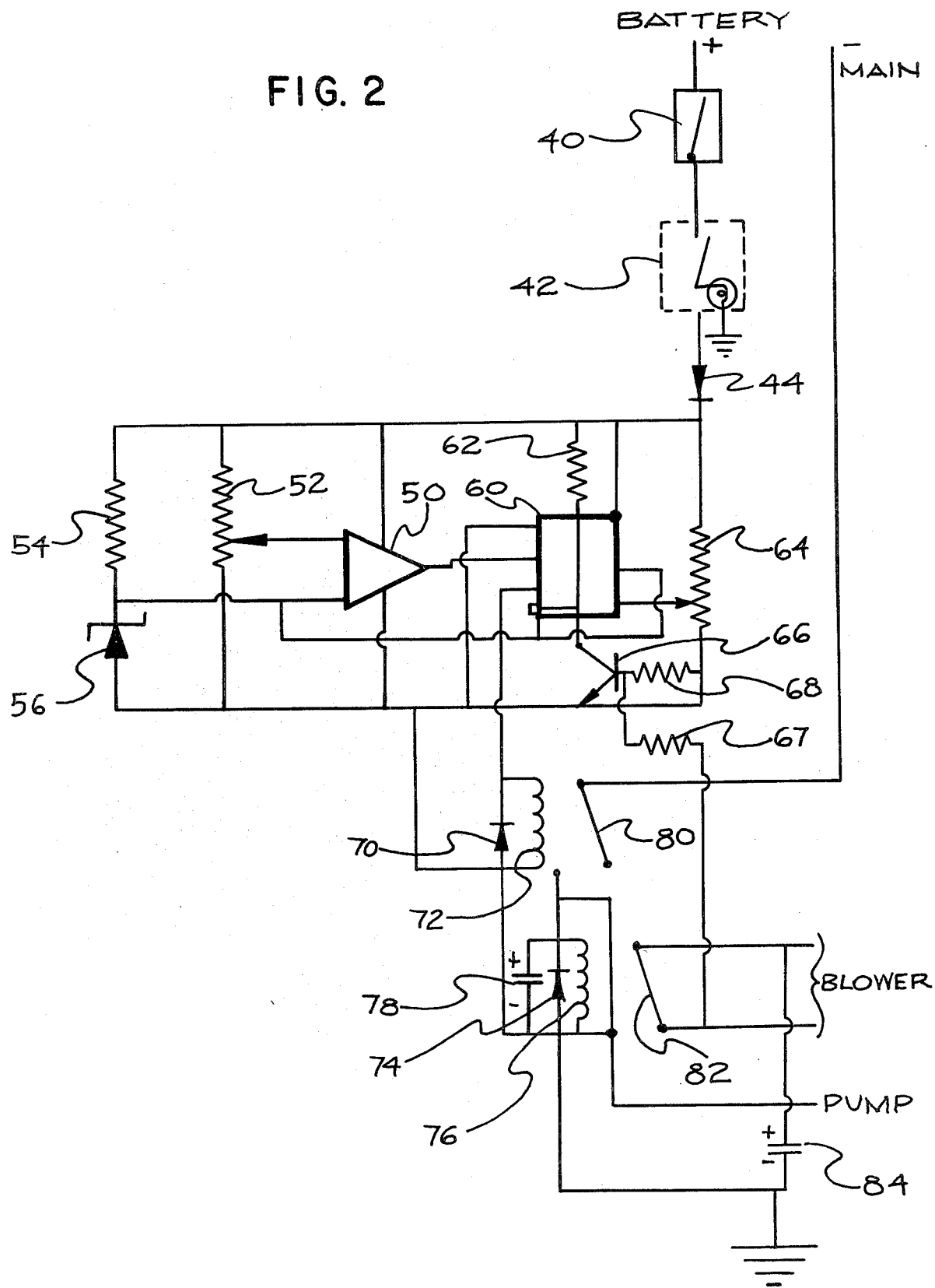
FIG. 2 is a schematic diagram of the electrical system comprising the voltage control circuit of the present invention.

The vehicle DC power source, referred to as "battery" in FIG. 2, is in electrical communication with a thermostatic switch 40. Thermostatic switch 40 is in communication with the engine coolant and, where the coolant temperature is above a predetermined level, switch 40 permits electrical communication between the power source and an illuminated manual switch 42. The manual switch 42 may be conveniently located on the dashboard of the vehicle in a position easily accessible to the operator whereby the auxiliary circulation system may be manually actuated or de-actuated.

A first voltage responsive switch is comprised of elements 50, 52, 54, and 56.

A 741 operational amplifier 50 is connected to potentiometer 52. The first voltage responsive switch circuitry also includes a resistor 54 and a Zener diode 56.

The second voltage responsive switch is comprised of elements 60, 62, 64, 66, 67, and 68.

A 555 timer 60 is utilized as a switching element and is connected to resistor 62, potentiometer 64, transistor 66, and resistors 67 and 68.

Pump 30 and blower 26 are in electrical communication with the second voltage responsive actuation switch timer 60 via Bosch relays 72 and 76, and associated contacts 80 and 82 which, when closed, completes the circuit from the power source to the pump and blower, respectively. Diodes 70 and 74 are associated with relays 72 and 76, respectively, to protect the operational amplifier and the timer against voltage surges. Capacitors 78 and 84 reduce or eliminate motor noise.

In operation, when the vehicle engine is turned off, manual switch 42 is turned on. Thermostatic switch 40 is in a closed position so long as the coolant temperature remains above the desired and predetermined minimum temperature level. Assuming that the system has been connected to the power source of the vehicle properly, diode 44 permits current to flow to first and second voltage responsive switches; otherwise the system will not function.

Resistor 54 is selected to provide an appropriate load for Zener diode 56. In the preferred embodiment, resistor 54 is a 470 ohm, 0.25 watt resistor. Potentiometer 52 is adjusted to turn off operational amplifier 50 if the power source voltage exceeds a predetermined upper level which, in the preferred embodiment, is 13 volts. If the voltage of the power source is less than 13 volts, operational amplifier 50 will not turn off; however, if upon actuation of manual switch 42 the voltage of the power source exceeds 13 volts, operational amplifier 50 is turned off, which in turn switches timer 60 on and timer 60 remains on even though the voltage from the power source may subsequently fall below 13 volts.

Potentiometer 64 ratios the voltage of the power source. The circuit providing input to timer 60 from resistor 54 and Zener diode 56 provides a constant reference voltage to timer 60.

At the commencement of operation of the system when the power source has a relatively high voltage, the reference voltage provided by resistor 54 and Zener diode 56 is relatively low compared to the voltage input to timer 60 from potentiometer 64. The voltage input to timer 60 from potentiometer 54 will decrease with time as the power source is drained. Potentiometer 64 is adjusted so that if the voltage from the power source drops below a predetermined lower level, timer 60, acting as a switch, will open and the circuit between the pump and blower and the power source will be broken. Generally, in the preferred embodiment, the lower voltage level is set at about 10.7 volts.

The control system of the present invention also provides for automatic turn off of the auxiliary pump system upon actuation of the ignition system. This is accomplished by communicating the blower power line with timer 60 via resistor 67 and transistor 66, the blower being connected to the power system via the ignition system separately (by conventional circuitry, not shown) from the control system being described in order that the blower may be operated while the engine is running.

I claim:

1. In an auxiliary circulation system for vehicle heaters including an electric pump means for effecting the circulation of coolant and control means electrically communicating said auxiliary electric pump means with the vehicle's electric power supply, said control means including a manual switch, the improvement in said control means comprising:

a first voltage responsive switch assembly located in the circuit between said manual switch and said electric pump means which, when said manual switch is closed, closes if the voltage of said power supply exceeds a predetermined first voltage level, said first voltage responsive switch assembly including means for establishing a reference voltage, first potentiometer means, and first switch means coupled to such reference voltage means and potentiometer, said first switch means being capable of comparing the voltages received from said reference voltage means and said first potentiometer means and closing if the ratio between the voltages received therefrom indicate that said predetermined first voltage level has been exceeded, and a second voltage responsive switch assembly located in the circuit between said first voltage responsive switch assembly and said electric pump means which, when said first voltage responsive switch is closed, closes and remains closed until the voltage of such power supply drops below a predetermined second voltage level lower than said first voltage level at which time said second voltage responsive switch opens.

2. In an auxiliary circulation system for vehicle heaters including an electric pump means for effecting the circulation of coolant and control means electrically communicating said auxiliary electric pump means with the vehicle's electric power supply, said control means including a manual switch, the improvement in said control means comprising:

a first voltage responsive switch assembly located in the circuit between said manual switch and said electric pump means which, when said manual switch is closed, closes if the voltage of said power supply exceeds a predetermined first voltage level, and a second voltage responsive switch assembly located in the circuit between said first voltage responsive switch assembly and said electric pump means which, when said first voltage responsive switch is closed, closes and remains closed until the voltage of such power supply drops below a predetermined second voltage level lower than said first voltage level at which time said second voltage responsive switch opens, said second voltage responsive switch assembly including second potentiometer means coupled to said power supply and second switch means, said second switch means being coupled to said reference voltage means and capable of comparing the voltages received from said reference voltage means and said second potentiometer and opening if the ratio of the voltages received therefrom indicates that said predetermined second voltage level is no longer being exceeded.

3. The auxiliary circulation system of claim 1 wherein said first switch means is an operational amplifier.

4. The auxiliary circulation system of claim 2 wherein said second switch means is a timer.

5. The auxiliary circulation system of claim 1, wherein said second voltage responsive switch assembly is also coupled to the blower of such heater.

6. The auxiliary circulation system of claim 1 where said electric pump means is coupled to said second voltage responsive switch assembly through a capacitor and a shorting diode located in parallel.

7. The auxiliary circulation system of claim 1 including means for opening the circuit between said power supply and such electric pump means when the ignition system of said vehicle is actuated.

* * * * *